(No Model.)

P. SCHEIDER.
CLIP FOR CLOTH STRETCHING MACHINES.

No. 366,431. Patented July 12, 1887.

Witnesses:

Inventor:
Paul Scheider.

UNITED STATES PATENT OFFICE.

PAUL SCHEIDER, OF ZITTAU, OBERLAUSITZ, SAXONY, GERMANY.

CLIP FOR CLOTH-STRETCHING MACHINES.

SPECIFICATION forming part of Letters Patent No. 366,431, dated July 12, 1887.

Application filed May 18, 1885. Serial No. 165,950. (No model.) Patented in England June 2, 1885, No. 6,680; in Austria-Hungary July 28, 1885, No. 17,818 and No. 37,937, and in Germany July 29, 1885, No. 32,484.

*To all whom it may concern:*

Be it known that I, PAUL SCHEIDER, a subject of the King of Saxony, residing at Zittau, in the county of Oberlausitz, Saxony, Germany, have invented a new and useful Improvement in Clips for Cloth-Stretching Machines, (for which I have received Letters Patent in Germany, July 29, 1885, No. 32,484; Austria, July 28, 1885, No. 17,818, register tome 35, fol. 1,536; Hungary, July 28, 1885, No. 37,937, privilege register tome 19, fol. 1,523, and Great Britain, June 2, 1885, No. 6,680,) of which the following is a specification.

Figure 1:
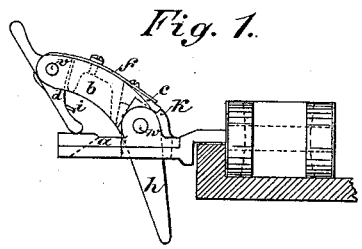
Figure 3:
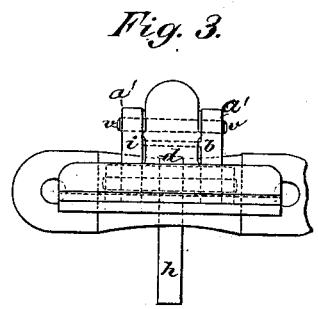
Figure 2:
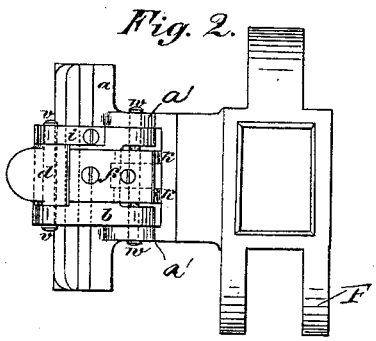
Figure 4:
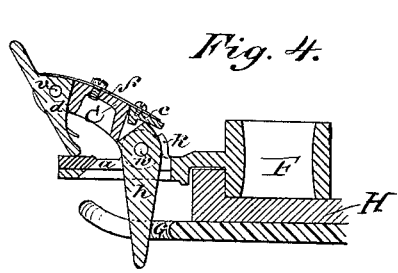
Figure 5:
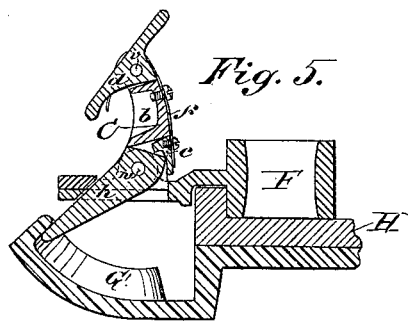

In the accompanying drawings, forming a part of this specification, Figure 1 is a view in elevation of a clip constructed in accordance with my invention, showing the same applied to a link adapted to form part of one of the endless chains in common use in cloth-stretching machines, and representing in section one of the rails for guiding the links of such chain. Fig. 2 is a plan view of the parts shown in Fig. 1, with the rail omitted. Fig. 3 is an end view thereof. Fig. 4 is a view in section of the parts represented in Fig. 1, showing in addition a stationary cam, whereby the clip is acted upon to open the same. Fig. 5 is a similar view showing a stationary cam, whereby the clip is acted upon to close the same.

*a* is a plate constituting the lower clamping-surface of the clip and formed with an opening therethrough, as shown. Within the opening is placed the arm *h*, which is pivoted on the pin *w*, passed through lugs *a'*, rising from the upper side of the plate; also, pivoted on the pin *w*, by ears passing outside of the arm *h*, is the arm C, having pivoted to its free end by the pin *v* the jaw *d*, constituting the upper clamping-surface of the clip. A bent spring, *i*, attached to the arm C and acting at its free end upon the lower arm of jaw *d*, tends to hold the said jaw in the position shown in the drawings. Attached to the arm C by a spring, *f*, is a catch-piece, *c*, adapted for engagement with lugs *k*, formed on plate *a*, as will be described.

The operation of the clip constructed as shown is as follows: Fig. 1 shows the clip in its closed condition. As shown in such figure, the jaw *d* is prevented from rising from the plate *a* by the engagement of catch *c* with the upper ends of the lugs *k*. If, now, arm *h* is moved toward the left into the position indicated in Fig. 4, it first will act by one of the angles of its upper end upon the catch *c* and raise the same out of contact with lugs *k*, and then continued movement of said arm will cause arm C to be raised and moved into the position represented in Fig. 5. While thus open the arm C will be held against accidental movement by the contact of the catch *c* with the outer rounded surfaces of the lugs *k*. The spring *i* allows the jaw *d* to adapt itself to the thickness of the cloth placed beneath the same. The catch *c*, co-operating with the lugs *k*, it will be seen, serves to lock the arm C in each of its two different positions.

The clip constructed as shown and described is applicable to various forms of machines. Thus I have represented the same in the drawings as applied to one of the links F of an endless clip chain, such as is commonly employed in cloth stretching and finishing machines. As usual, this chain slides upon a guide-rail, H, to which latter I have shown applied, for the purpose of opening and closing the clip automatically, the cams G and G', the former acting to throw the arm *h* to the left to open the clip as the chain passes along the rail H, and the latter serving to throw the said arm to the right to again close the clip. A series of clips may be applied to the circumferences of two diverging disks or wheels—such as are commonly employed—and arranged to similarly coact with stationary or other cams.

If the clips are applied to the side bars of what are termed "stationary" frames—*i. e.*, frames in which cloth is stretched between parallel bars which are gradually forced apart by means of screws—the arms *h* of all the clips of each side bar may be caused to engage with a single actuating bar or strip, and thereby may be simultaneously operated to open or close them.

Having thus described my invention and the manner of applying the same, I claim—

The combination, with the plate *a*, having the lugs *k* thereon, as described, of the arms *h* and C, the jaw *d*, the spring *f*, and the catch-piece *c*, all as and for the purpose set forth.

PAUL SCHEIDER.

Witnesses:
  RUPERT KOEPFALT,
  OSCAR SCHÜLLER.